(12) United States Patent
Carlsson

(10) Patent No.: US 7,803,339 B2
(45) Date of Patent: Sep. 28, 2010

(54) METHOD FOR DISPOSAL OF DI-SULPHIDE COMPOUNDS

(75) Inventor: Anders Carlsson, Amsterdam (NL)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 12/280,034

(22) PCT Filed: Feb. 20, 2007

(86) PCT No.: PCT/EP2007/051588

§ 371 (c)(1),
(2), (4) Date: Aug. 20, 2008

(87) PCT Pub. No.: WO2007/096345

PCT Pub. Date: Aug. 30, 2007

(65) Prior Publication Data

US 2009/0028769 A1 Jan. 29, 2009

(30) Foreign Application Priority Data

Feb. 22, 2006 (EP) .................................. 06110255

(51) Int. Cl.
*B01D 53/48* (2006.01)
(52) U.S. Cl. .............................. 423/244.09; 423/242.1; 423/573.1; 423/574.1
(58) Field of Classification Search ................ 423/511, 423/539, 542, 561.1, 563, 567.1, 571, 573.1, 423/574.1, 576.8, 210, 220, 222
See application file for complete search history.

(56) References Cited

U.S. PATENT DOCUMENTS

| | | | | |
|---|---|---|---|---|
| 2,921,021 A * | 1/1960 | Urban et al. | ................ | 208/205 |
| 3,854,876 A * | 12/1974 | Rankine et al. | ............. | 423/570 |
| 3,860,697 A * | 1/1975 | Palm | ........................ | 423/574.1 |
| 4,117,100 A * | 9/1978 | Hellmer et al. | ............. | 423/569 |
| 4,276,912 A * | 7/1981 | Pejchal et al. | ................ | 139/437 |
| 4,347,226 A * | 8/1982 | Audeh et al. | ................. | 588/318 |
| 4,426,369 A | 1/1984 | Palm | ........................... | 423/574 |
| 5,658,541 A | 8/1997 | Matros et al. | ................ | 423/210 |
| 5,997,731 A | 12/1999 | Suarez | ........................ | 208/230 |
| 2004/0159583 A1 | 8/2004 | Mesters et al. | .............. | 208/208 |

FOREIGN PATENT DOCUMENTS

| | | |
|---|---|---|
| EP | 0405003 | 1/1991 |
| WO | WO0234863 | 5/2002 |

OTHER PUBLICATIONS

A. Kh. Sharipov, "Chemistry and Technology of Fuels and Oils", vol. 38, p. 28-284.*

* cited by examiner

*Primary Examiner*—Stuart Hendrickson
*Assistant Examiner*—Richard M Rump
(74) *Attorney, Agent, or Firm*—Charles W. Stewart

(57) ABSTRACT

The invention provides a method for disposal of di-sulphide compounds having the general formula of R—S—S—R, wherein R is an alkyl group, the method comprising the steps of: (a) combusting said di-sulphide compounds in the presence of an oxygen-containing gas in a sulphur dioxide generation zone, whereby at least part of the di-sulphide compounds is converted to sulphur dioxide to obtain a gas stream comprising sulphur dioxide; (b) reacting the gas stream comprising sulphur dioxide with hydrogen sulphide to obtain elemental sulphur.

13 Claims, 1 Drawing Sheet

METHOD FOR DISPOSAL OF DI-SULPHIDE COMPOUNDS

Figure 1:
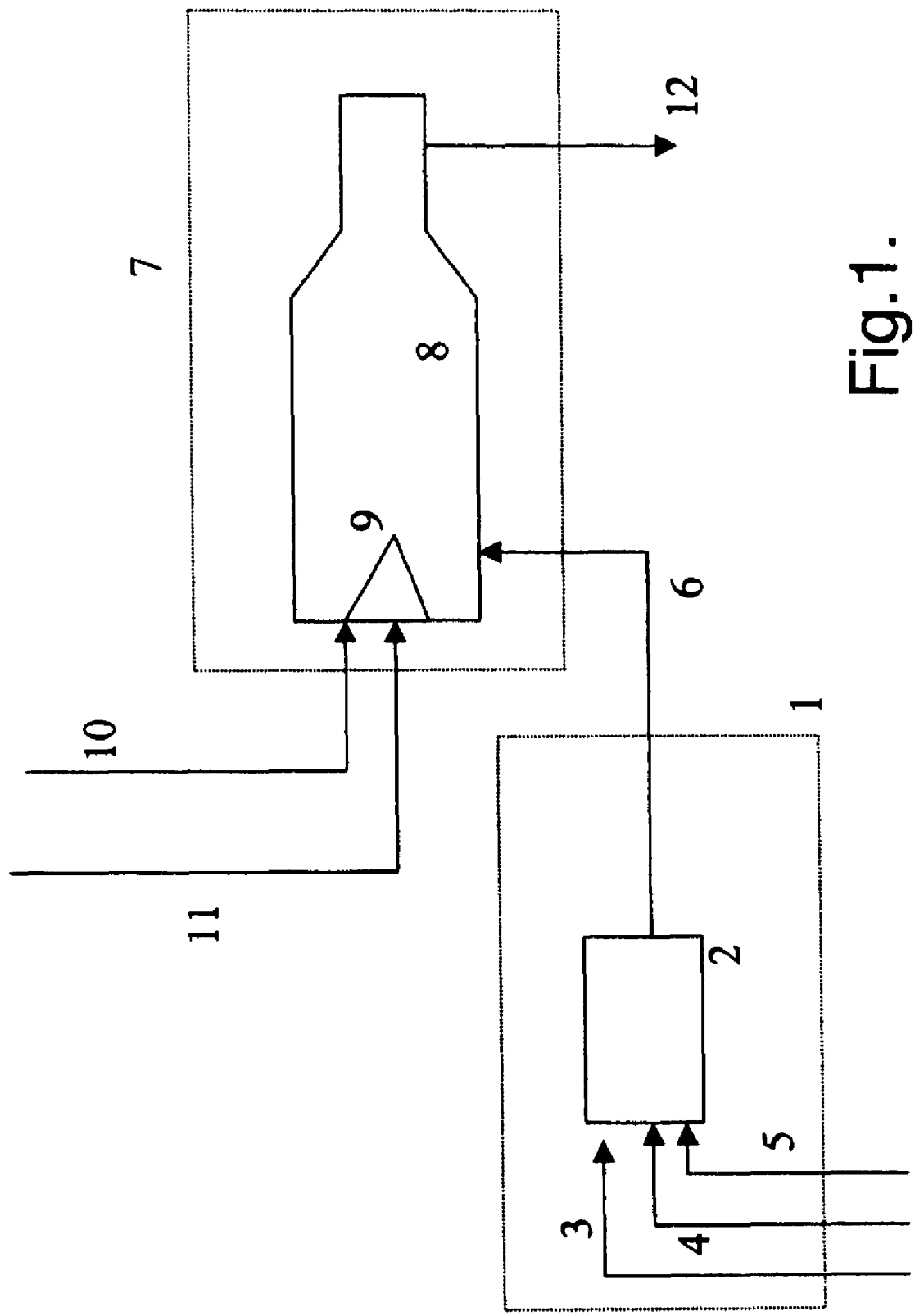

The present application claims priority of European Patent Application No. 06110255.4 filed 22 Feb. 2006.

The invention relates to a method for disposal of di-sulphide compounds.

Di-sulphide compounds, compounds having the general formula R—S—S—R, wherein R is an alkyl group, can be formed as by-products from industrial processes, especially refinery processes. Such a process is for example an industrial process wherein mercaptans are removed from a liquid condensate. Removal of mercaptans from a liquid condensate phase is commonly done by treating the condensate phase with caustic, as described in R. N. Maddox and D. J. Morgan in "Gas Conditioning and Processing", volume 4: Gas Treating and Liquid Sweetening, Campbell Petroleum Series, Norman, Okla., 1998. This treatment results in the formation of di-sulphide compounds. As the sources used to obtain the liquid condensates, e.g. natural gas, shale oil, tar sands etc. contain more mercaptans, formation of di-sulphide compounds has increased and as a consequence, disposal of di-sulphide compounds has become more important.

A known method for disposal of di-sulphide compounds is their use in other processes or products. Examples of these are given in A. Kh. Sharipov, "Chemistry and Technology of Fuels and Oils", Vol. 38, p. 280-284 and include the use of di-sulphide compounds as odorants for natural gas for domestic use, for sulphurising of cobalt- and nickel molybdenum catalysts for petroleum refining processes and in agrochemistry. Hydrodesulphurisation is also a commonly used disposal method for di-sulphide compounds. A drawback of these disposal methods is that they are all fundamentally different from the process wherein the di-sulphide compounds are produced. Thus, removal and transport of di-sulphide compounds is necessary, followed by processing of the di-sulphide compounds using a separate, dedicated method. Often, expensive and sensitive catalysts need to be employed to enable processing of di-sulphide compounds. Another drawback is that the amount of di-sulphide compounds which can be disposed of using these specialised methods is limited.

Thus, there is a need for a simple and effective method for disposal of di-sulphide compounds, preferably enabling disposal of di-sulphide to be done in the same process line-up as the one wherein the di-sulphide compounds are produced. In addition, disposal of relatively large amounts of di-sulphide compounds is desired.

To this end, the invention provides a method for disposal of di-sulphide compounds having the general formula of R—S—S—R, wherein R is an alkyl group, the method comprising the steps of:

(a) combusting said di-sulphide compounds in the presence of an oxygen-containing gas in a sulphur dioxide generation zone, whereby at least part of the di-sulphide compounds is converted to sulphur dioxide to obtain a gas stream comprising sulphur dioxide;

(b) reacting the gas stream comprising sulphur dioxide with hydrogen sulphide to obtain elemental sulphur.

The method enables disposal of di-sulphide compounds in a relatively easy and straightforward way. In the event that di-sulphide compounds are produced in an overall process line-up which includes a so-called Claus furnace, disposal of di-sulphide compounds can be done using the Claus furnace. Thus, an elegant incorporation of disposal of di-sulphide compounds into the overall process line-up can be achieved.

Because the sulphur dioxide formed is reacted with hydrogen sulphide to elemental sulphur, no unwanted emission of sulphur dioxide into the atmosphere takes place. The resulting product, elemental sulphur, will be in the liquid or solid state. Thus, handling of the product is easier. In addition, the elemental sulphur may be used as such, without elaborate further processing, for example as an ingredient for fertilisers, cement or asphalt.

In step (a), di-sulphide compounds having the general formula of R—S—S—R, wherein R is an alkyl group, are combusted e in the presence of an oxygen-containing gas, whereby at least part of the di-sulphide compounds is converted to sulphur dioxide ($SO_2$) to obtain a gas stream comprising $SO_2$.

Without wishing to be bound by any theory with regard to the reactions taking place in step (a), it is believed that complete combustion of the di-sulphide compounds takes place via reaction (1):

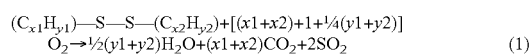

$$(C_{x1}H_{y1})-S-S-(C_{x2}H_{y2})+[(x1+x2)+1+\tfrac{1}{4}(y1+y2)]O_2 \rightarrow \tfrac{1}{2}(y1+y2)H_2O+(x1+x2)CO_2+2SO_2 \quad (1)$$

Incomplete combustion, for example if oxygen is present in an amount less than what is stochiometrically needed for complete combustion, can lead to the unwanted formation of carbon monoxide. Thus, preferably the amount of oxygen-containing gas in step (a) is sufficient to combust at least 80% of the di-sulphide compounds to sulphur dioxide. To further avoid incomplete combustion, in a more preferred embodiment the amount of oxygen in the oxygen-containing gas supplied to the sulphur dioxide generation zone corresponds to an amount of oxygen at least equal to the stoichiometric amount needed to convert the di-sulphides to sulphur dioxide and to the corresponding combustion products. Even more preferably, an excess of oxygen is used, preferably such that the exhaust gas exiting the sulphur dioxide generation zone comprises in the range of from 1 to 3, preferably 1.5 to 2 vol % of oxygen-containing gas.

Suitable oxygen-containing gases include air, oxygen-enriched air or an oxygen-enriched inert gas. The amount of oxygen present in the oxygen-containing gas can vary widely and is suitably in the range of from 10 v/v % to 100 v/v %, based on the total oxygen-containing gas.

Combustion takes place at elevated temperature. Preferably, the combustion of di-sulphide compounds is done at temperatures in the range of from 700° C. to 1800° C., more preferably from 800° C. to 1700° C., and even more preferably from 1100 to 1400° C. At the preferred temperature ranges, combustion proceeds at a favourable rate while conversion of di-sulphide compounds to sulphur dioxide is high.

It is believed that the combustion of di-sulphide compounds is an autothermal process. Only at the start-up, heat needs to be supplied in order to heat up the sulphur dioxide generation zone to temperatures above the ignition temperature of the di-sulphide compounds, typically 440 to 460° C. After achieving the process temperature of 700 to 800° C., and start of di-sulphide combustion, the temperature will remain high as a result of the exothermic combustion reaction.

Preferably, the sulphur dioxide generation zone comprises a di-sulphide burner, to which the di-sulphide compounds and oxygen-containing gas are fed. The di-sulphide burner is used to convert di-sulphides to sulphur dioxide to obtain the gas stream comprising sulphur dioxide. Suitable di-sulphide burners are burners commonly applied in the Claus process.

A preferred way to feed the di-sulphide compounds to the di-sulphide burner is by spraying the di-sulphide compounds into the di-sulphide burner in solid or in liquid state, preferably in liquid state. This results in an enlargement of the surface of di-sulphide compounds and enhances the conversion of di-sulphide compounds to sulphur dioxide. The spraying can for example be done via a nozzle. Optionally, a spraying medium can be added to the di-sulphide compounds as a diluent, to further increase the contact area. Suitable spraying mediums are mediums which will not react in any way with the di-sulphide compounds and include nitrogen gas or water vapour.

In step (b), the gas stream comprising sulphur dioxide is reacted with a gas stream comprising hydrogen sulphide in the presence of an oxygen-containing gas to obtain elemental sulphur. Without wishing to limit the invention to a specific reaction path, it is believed that hydrogen sulphide ($H_2S$) is converted to elemental sulphur following reaction (2), known in the art as the so-called Claus reaction.

$$2H_2S + SO_2 \rightarrow 2H_2O + 3/nSn \quad (2)$$

Preferably, step (b) takes place in the presence of a catalyst. This enables a higher conversion of $H_2S$ to elemental sulphur. Suitable catalysts include activated alumina and titania catalysts. Catalysts with areas over 300 $m^2/g$, macroporosities over 0.15 ml/g, and macropore radii as high as allowed by pellet density are preferred as they show enhanced performance. Other suitable catalysts include activated bauxite (surface area of 184 $m^2/g$) and cobalt-molybdenum hydrogenation catalysts (surface area of 270 $m^2/g$).

In a preferred embodiment step (a) is performed using a di-sulphide burner, and step (b) is performed in a Claus furnace. The di-sulphide burner is coupled to the Claus furnace to enable transfer of the gas stream exiting the di-sulphide burner to the Claus furnace and oxygen-containing gas is fed to the di-sulphide burner. More preferably, the di-sulphide burner is located in the combustion chamber of the Claus furnace.

In a more preferred embodiment, the di-sulphide burner is complemented by an acid gas burner. Oxygen-containing gas and a gas stream comprising hydrogen sulphide are fed to the acid gas burner, thereby converting at least part of the hydrogen sulphide to sulphur dioxide following reaction (3).

$$2H_2S + 3O_2 \rightarrow 2H_2O + 2SO_2 \quad (3)$$

The combination of reactions (2) and (3) is known in the art as the Claus process. The Claus process is frequently employed in refineries for the processing of $H_2S$ recovered from natural gas or other sources. The Claus process is suitably performed in a Claus furnace comprising a combustion chamber, wherein reaction (3) takes place, and an elemental sulphur producing zone, wherein reaction (2) takes place. The acid gas burner is coupled to the Claus furnace, to enable transfer of the gas stream exiting the acid gas burner to the Claus furnace. Preferably, the acid gas burner is located in the Claus furnace.

Combustion of $H_2S$ to $SO_2$ (reaction (3)) is suitably done at high temperatures, generally in the range of from 1000 to 1400° C., while the formation of elemental sulphur (reaction (2)) is suitably performed at lower temperatures, generally in the range of from 200 to 350° C.

Preferably, the amount of oxygen-containing gas supplied to the Claus furnace is sufficient to combust at least 70%, more preferably at least 80% of the hydrogen sulphide to sulphur dioxide.

Preferably, the total amount of oxygen-containing gas, the total amount being the sum of oxygen-containing gas fed to the di-sulphide burner and to the combustion chamber of the Claus furnace, is sufficient to combust at least 80% of the di-sulphide compounds to sulphur dioxide and/or to convert at least 70% of the hydrogen sulphide to sulphur dioxide. It will be understood that the amount of oxygen-containing gas which is fed to the di-sulphide burner and/or to the Claus furnace can be adjusted in order to achieve the desired conversions.

The oxygen-containing gas may be supplied to the di-sulphide burner and to the combustion chamber using a common supply conduit which branches into supply conduits leading to the di-sulphide burner and to the combustion chamber or using separate supply conduits leading to the di-sulphide burner and to the combustion chamber. It is preferred to have individual control means to enable regulating the supply of oxygen-containing gas to the di-sulphide burner independently from the supply of oxygen-containing gas to the combustion chamber.

In a preferred embodiment, the exhaust gas of the di-sulphide burner and optionally of the acid gas burner is adiabatically conveyed to the combustion chamber of the Claus furnace. The exhaust gas of both burners comprises sulphur dioxide.

The method enables disposal of relatively large amounts of di-sulphide compounds, even as large as several tonnes of di-sulphide compounds per day. Suitably, up to 40 tonnes of di-sulphide compounds per day can be disposed.

The method is suitable for disposal of di-sulphide compounds originating from various sources. For example, the di-sulphide compounds can be obtained by converting mercaptans to di-sulphide compounds.

In a well-known industrial process, mercaptans are converted to di-sulphide compounds by reacting mercaptans with sodium hydroxide to obtain mercaptide compounds and converting at least part of these mercaptide compounds to obtain di-sulphide compounds.

Mercaptans can occur in gas streams or can be part of a hydrocarbon condensate phase.

An example of a mercaptan-comprising hydrocarbon phase is a hydrocarbon condensate phase obtained by removing entrained water and/or liquid hydrocarbons from a natural gas stream comprising mercaptans, whereby at least part of the mercaptans present in the natural gas stream are taken up in the entrained water and/or in the liquid hydrocarbons.

Mercaptans can also be part of a gas stream. Examples of gas stream comprising mercaptans include natural gas streams and gas streams which have been used to transfer mercaptans from solid adsorbent beds loaded with mercaptans (regeneration gas streams). Mercaptans in the gas stream comprising mercaptans can be converted to di-sulphides by treatment with sodium hydroxide.

The invention will now be illustrated by way of example with reference to the FIGURE. In the FIGURE, a sulphur dioxide generation zone is shown (1), comprising a di-sulphide burner (2). Oxygen-containing gas is supplied to the di-sulphide burner via line (3). Di-sulphide compounds are supplied to the di-sulphide burner via line (4). Nitrogen gas is optionally supplied as spraying medium to the di-sulphide burner via line (5). In the di-sulphide burner, di-sulphide compounds are combusted to sulphur dioxide and other combustion products. The resulting gas stream comprising sulphur dioxide is led via line (6) to a Claus furnace (7). The Claus furnace comprises a combustion chamber (8) and an acid gas burner (9). A gas stream comprising hydrogen sulphide is supplied to the Claus furnace via line (10). Oxygen-containing gas is supplied to the Claus furnace via line (11). In the acid gas burner, part of the hydrogen sulphide is converted to sulphur dioxide. Another part of the hydrogen sulphide is reacted with sulphur dioxide to form elemental sul- That which is claimed is:

1. A method for disposal of alkyl di-sulphide compounds having the general formula of R—S—S—R, wherein R is an alkyl group, the method comprising the steps of:
   (a) combusting said alkyl di-sulphide compounds in the presence of an oxygen-containing gas in a sulphur dioxide generation zone using a di-sulphide burner, whereby at least part of the alkyl di-sulphide compounds is converted to sulphur dioxide to obtain a gas stream comprising sulphur dioxide and wherein the alkyl di-sulphide compounds are combusted at a temperature in the range of from 700° C. to 1800° C.;
   (b) reacting the gas stream comprising sulphur dioxide with hydrogen sulphide to obtain elemental sulphur in a Claus furnace, wherein the di-sulphide burner is coupled to the Claus furnace and oxygen-containing gas is fed to the di-sulphide burner.

2. A method according to claim 1, wherein step (b) is performed in the presence of a catalyst.

3. A method according to claim 1, wherein the alkyl di-sulphide compounds are combusted at a temperature in the range of from 800° C. to 1700° C.

4. A method according to claim 1, wherein the amount of oxygen in the oxygen-containing gas fed to the sulphur dioxide generation zone corresponds to an amount of oxygen at least equal to the amount needed to convert the alkyl di-sulphides to sulphur dioxide and to the corresponding combustion products.

5. A method according to claim 1, wherein the alkyl di-sulphide compounds are combusted at a temperature in the range of from 1100° C. to 1400° C.

6. A method according to claim 5, wherein the di-sulphide burner is complemented by an acid gas burner coupled to the Claus furnace, and oxygen-containing gas as well as a gas stream comprising hydrogen sulphide are fed to the acid gas burner to convert at least part of the hydrogen sulphide to sulphur dioxide.

7. A method according to claim 6, wherein the total amount of oxygen-containing gas is sufficient to combust at least 80% of the alkyl di-sulphide compounds to sulphur dioxide and to convert at least 70% of the hydrogen sulphide to sulphur dioxide.

8. A method according to claim 7, wherein the exhaust gas of the di-sulphide burner is adiabatically conveyed to the combustion chamber of the Claus furnace.

9. A method according to claim 8, wherein the exhaust gas of the di-sulphide burner and the acid gas burner is adiabatically conveyed to the combustion chamber of the Claus furnace.

10. A method according to claim 9, wherein the alkyl di-sulphide compounds are obtained by reacting mercaptans with sodium hydroxide to obtain mercaptide compounds and converting at least part of said mercaptide compounds to obtain the di-sulphide compounds.

11. A method according to claim 5, wherein the alkyl di-sulphide compounds are sprayed into the di-sulphide burner in solid or liquid state using a spraying medium.

12. A method according to claim 11, wherein the spraying medium is selected from the group consisting of nitrogen gas or water vapor.

13. A method according to claim 5, wherein an excess amount of oxygen is used, such that the exhaust gas exiting the sulphur dioxide generation zone comprises 1 to 3 vol % oxygen-containing gas.

* * * * *